United States Patent [19]
Abboud et al.

[11] Patent Number: 5,402,739
[45] Date of Patent: * Apr. 4, 1995

[54] CLOSED LOOP INCINERATION PROCESS

[76] Inventors: Harry I. Abboud, 5845 Clematis Dr., Baton Rouge, La. 70808; Chip E. Efferson, Rte. 2, Box 2445, Ethel, La. 70730

[*] Notice: The portion of the term of this patent subsequent to Jan. 19, 2010 has been disclaimed.

[21] Appl. No.: 143,339
[22] Filed: Oct. 27, 1993
[51] Int. Cl.$^6$ .............................................. F23J 11/00
[52] U.S. Cl. .................................. 110/346; 110/345; 110/204
[58] Field of Search ............... 110/204, 205, 206, 208, 110/233, 235, 216, 344, 345, 346

[56] References Cited
U.S. PATENT DOCUMENTS

| 4,341,167 | 7/1982 | St. John | 110/235 |
| 4,355,601 | 10/1982 | Hattiangadi | 123/4 D |
| 4,878,440 | 11/1989 | Tratz et al. | 110/233 |
| 5,123,364 | 6/1992 | Gitman et al. | 110/346 |
| 5,170,725 | 12/1992 | Sass et al. | 110/236 |
| 5,179,903 | 1/1993 | Abboud et al. | 110/345 |

Primary Examiner—Henry A. Bennett
Assistant Examiner—William C. Doerrler
Attorney, Agent, or Firm—Llewellyn A. Proctor

[57] ABSTRACT

An incineration process which can utilize any type of incineration means for disposing of hazardous, as well as non-hazardous, burnable waste. Such waste include toxic combustible liquids, oil slurries, soils contaminated with dioxin, PCBs, creosote, or any other potentially toxic combustible material. In particular, the present invention relates to an incineration process which has no continuous stack discharge of polutants. In this process, the flue gas stream from the incineration stages is enriched with oxygen and fed to a downstream combustion zone. A portion of the flue gas stream from the downstream combustion zone is enriched with oxygen and recycled to the incineration means. The remaining portion of the flue gas stream from the downstream combustion zone is scrubbed to remove acid gases and passed through a purification zone wherein any remaining contaminates are removed.

16 Claims, 1 Drawing Sheet

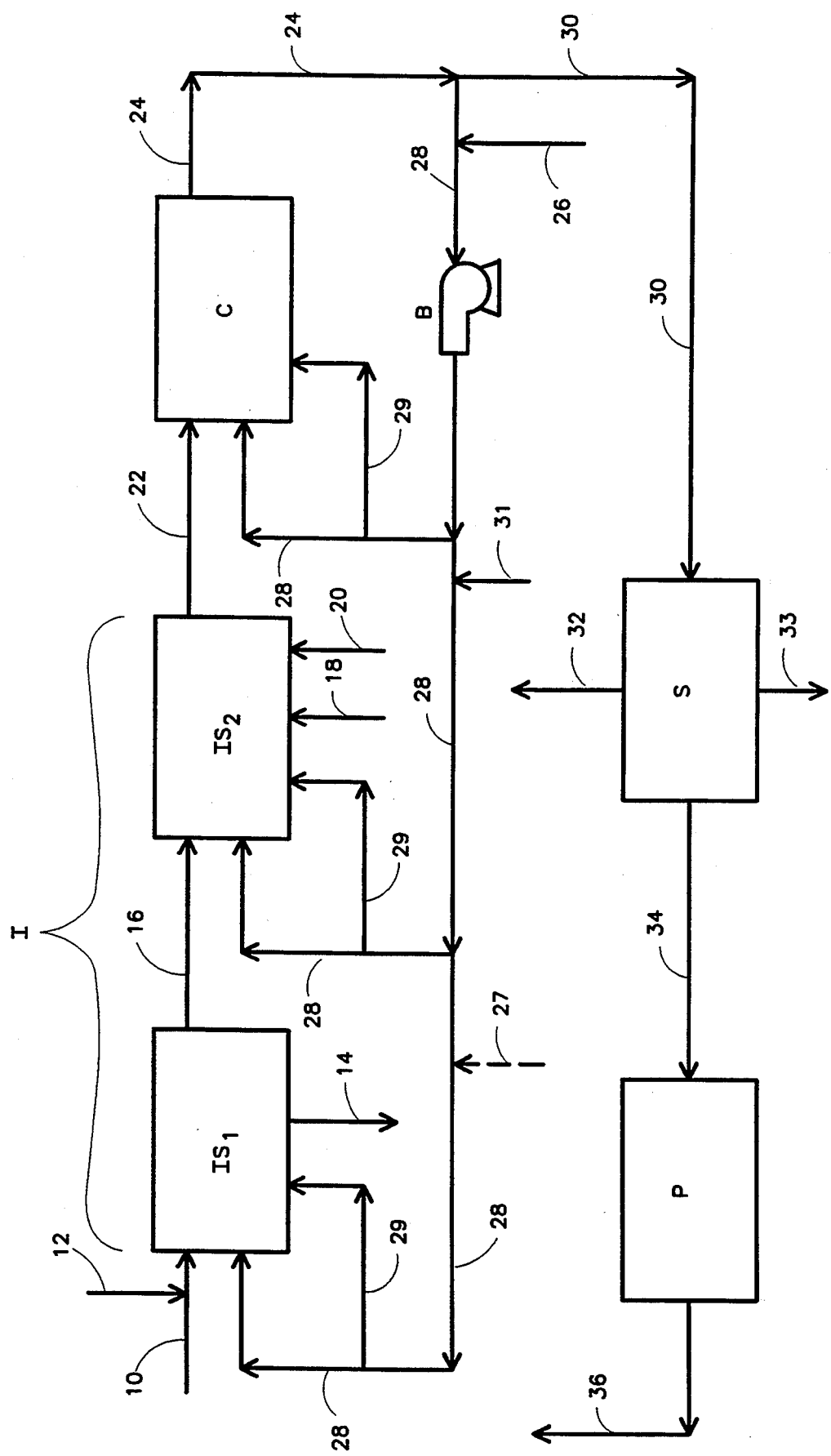

CLOSED LOOP INCINERATION PROCESS

FIELD OF THE INVENTION

This invention relates to an improved closed loop incineration/combustion process which can utilize any type of incineration means for disposing of hazardous, as well as non-hazardous, burnable waste. This incineration process has substantially no continuous stack discharge of pollution emissions. The resulting flue gases from incineration are sent to a downstream combustion zone and then to scrubbing and purification zones.

BACKGROUND OF THE INVENTION

The disposal of hazardous waste is increasingly becoming a serious problem to industry as governmental regulations become tighter and tighter. Two leading technologies for disposing of hazardous waste are landfills and incineration. While the industry has historically preferred landfills over incineration, primarily because of cost, incineration is becoming more attractive. One reason for this is because governmental regulations regarding landfills are getting tougher. For example, in 1989 a new extended list of chemical streams banned from landfills went into effect. As industry turns toward incineration as the primary means of disposing of hazardous waste, they are also being faced with tougher and tougher incineration restrictions. For example, the destruction and removal efficiency (DRE) ratings for incineration are presently set at 99.99% for most hazardous waste, and 99.9999% for polychlorinated biphenyls (PCBs).

This has created a substantial problem for industry. For example, in the petrochemical and oil producing states, the problem of cleaning up contaminated sites and waste-oil pits are already of paramount importance, and is becoming even more acute. The quantity of waste oil contamination at oil field drilling sites has become a problem of great magnitude. The necessity of hauling the accumulated contaminated material from wide spread areas of contamination to a central decontamination site aggravates the problem considerably. Likewise, the problem of cleaning up abandoned petrochemical sites is even more severe.

The problem is particularly intense in the burning of hazardous waste. This is because not only must the waste be rapidly disposed of before harm is done to the environment, but additionally, the destruction of any potentially toxic chemicals must be sufficiently complete so that the gases which evolve therefrom are non-hazardous. To completely decompose such chemicals, relatively highly efficient and high temperature combustion is needed to lower the cost of incineration, which is typically expensive.

The discharge stack emissions from incineration are typically an important concern for several reasons. One reason is that the public views stack emission plumes with suspicion, and sometimes justifiable fears, that the incinerator operator is discharging hazardous, or toxic, gases into the atmosphere. Another reason is that federal and state authorities have regulations governing stack emissions with regular monitoring, testing, and validation to insure that prescribed emission limits are not being exceeded.

U.S. Pat. No. 5,179,903 to the inventors hereof, teaches a multistage closed loop incineration process for disposing of waste material wherein a portion of the resulting flue gas stream is enriched with oxygen and recycled to the incineration means. The remaining portion is scrubbed to remove acid gases and passed through a purification zone wherein any remaining contaminants are removed. This patent does not teach converting the waste to flue gases which are then mixed with oxygen to produce synthetic air which is used in a downstream combustion device, such as an internal combustion engine, furnace, or boiler to produce useful thermal, mechanical, or electrical energy.

Therefore, there is a substantial need in the art for improved incineration processes which are able to meet the present destruction and removal efficiency requirements, as well as requirements in the foreseen future.

OBJECTIVES

It is an object of the present invention to provide an improved incineration process which does not have the conventional discharge stack emissions with the potential for emitting pollutants into the atmosphere.

It is another object of the present invention to provide an improved incineration process in which low nitrogen content flue gases from an incineration zone are enriched with oxygen and used as synthetic air in a downstream combustion zone.

Another object of the present invention is to provide an improved incineration process in which a portion of the flue gas stream from a combustion zone, downstream from the incineration zone is enriched with oxygen an recycled to both incineration zones.

A further object of the present invention is to provide a combustion zone, downstream from an incineration zone, which combustion zone is selected from the group consisting of a boiler, a furnace, an internal combustion engine, and a chemical process unit to produce thermal, mechanical, and/or electrical energy, and to reduce NOx formation from said combustion zone.

A still further object of the present invention is to provide a flue gas purification system in which any trace components of potentially undesirable chemical gases and vapors are removed from a portion of the carbon dioxide rich flue gases from the downstream combustion zone so that pure carbon dioxide and other gaseous products can be recovered.

SUMMARY OF THE INVENTION

In accordance with the present invention, there is provided an improved process for incinerating/combusting waste materials and utilizing the flue gases from an incineration zone in one or more downstream combustion zones wherein the exit flue gas stream is recovered and purified and pure carbon dioxide and other gaseous and/or chemical products are recovered and substantially no contaminants are released into the environment. The process comprises:

(a) feeding combustible waste material into the first stage of a two stage incineration zone wherein the waste is burned with an oxygen enriched flue gas stream, said oxygen enriched flue gas stream being recycled from a downstream combustion zone, at a temperature from about 1400° F. to about 2500° F.;

(b) passing the resulting flue gas stream from said first incineration stage to a second incineration stage which is operated at a temperature from about 1500° F. to about 3000° F., wherein additional waste is burned with oxygen enriched flue gas stream, said oxygen enriched flue gas stream being recycled from a downstream combustion zone;

(c) optionally passing the resulting flue gas from said second incineration zone to an indirect or direct cooling zone, if cooling is desired, where it is contacted with relatively cool surfaces of steam generator tubes or directly cooled with atomized water or an aqueous solution or slurry containing acid and/or alkaline salts from a downstream wet gas scrubbing zone, wherein the flue gas is cooled by at least about 1000° F. with or without the formation of acid salts;

(d) passing the flue gas stream from said cooling zone, or from the second incineration stage, to a separation zone where particulate material is separated and collected;

(e) mixing the flue gas stream from the separation zone with oxygen, to convert it to synthetic air, and passing said mixture to a downstream combustion zone where it is combusted with any fuel in a boiler, furnace, kiln, or internal combustion engine to produce useful thermal, mechanical, or electrical energy and minimize NOx generation;

(f) recycling a portion of the flue gas from the downstream combustion zone, after the addition of oxygen, to both the incineration stages;

(g) passing the remaining portion of the flue gases from the combustion zone to a scrubbing zone wherein acid gases are removed; and (h) passing the flue gases from the scrubbing zone to a purification zone containing one or more of the following stages: (i) a stage for removing CO and hydrocarbon gases; (ii) a stage for removing additional acid gases; and (iii) a stage for removing HCl, SOx, NOx, S, and any other trace components of potentially undesirable gases or vapors to promote essentially pure carbon dioxide recovery.

In a preferred embodiment of the present invention, the combustible waste material used in the practice of the present invention is a hazardous material and the flue gases from the scrubbing zone are passed to a purification zone containing a purifier substance selected from the group consisting of an aqueous alkaline solution or slurry, and activated carbon, wherein any remaining acid gases, and any other contaminants, such as hydrocarbon gas and sulfur compounds, are removed.

In another preferred embodiment of the present invention, the flue gases from the first incineration stage are passed to a gas/solids separation zone, preferably a cyclone separator, before entering the second incineration stage.

In yet another preferred embodiment of the present invention, the flue gases which are recycled from step (f) are compressed, and oxygen is added to bring the oxygen content up to at least 20 vol. %. Any liquid fraction is passed to the scrubbing zone.

BRIEF DESCRIPTION OF THE FIGURE

The sole figure hereof is a simplified flow diagram of a preferred embodiment of the incineration process of the present invention.

DETAILED DESCRIPTION OF THE INVENTION

Any combustible hazardous or non-hazardous material may be incinerated by the practice of the present invention. Non-limiting examples of such materials include toxic combustible liquids, oil slurries, soils contaminated with dioxin, creosote, PCBs, and any other potentially toxic combustible material.

The present invention can be best understood by reference to the sole figure hereof. Combustible waste material is fed via 10 into incineration zone I. Incineration zone I contains two temperature stages, $IS_1$ and $IS_2$. The first, or upstream stage $IS_1$ is maintained at a temperature from about 1400° F. to about 2500° F., preferably from about 1600° F. to about 2200° F., more preferably about 1800° F. to about 2100° F. The second, or downstream stage $IS_2$ is maintained at a temperature from about 1500° F. to about 3000° F., preferably from about 1800° F. to about 2500° F., and more preferably from about 2000° F. to about 2400° F. It is also preferred that the second stage be operated at a temperature in excess of about 100° F., more preferably about 200° F., and most preferably about 300° F. higher than that of said first incineration stage.

It is to be understood that both stages of the incineration zone can be contained in one incineration device, or each stage can be maintained in a separate device. It is preferred that one incineration device be used which contains both temperature stages.

A suitable fuel is introduced into incineration zone I via line 12. Any suitable fuel can be used which is capable of maintaining said incineration temperatures. Non-limiting examples of such suitable fuels include natural gas, fuel oil, hazardous waste(preferably liquid), and coal. Ash is removed from first combustion zone 1 via line 14. Flue gases from this first incineration stage are passed via line 16 to second incineration stage $IS_2$. It is understood that the flue gases from the first incineration stage may be passed through a cyclone separator prior to entering the second combustion zone. The cyclone separator may be any conventional cyclone separator used to separate particulate matter at the temperatures of the flue gases. The cyclone separator can be a single cyclone or a multi-cyclone system.

Additional combustible waste material may be introduced into said second incineration stage via line 18, with fuel and/or waste via line 20. The flue gases from said second incineration stage are passed via line 22 to downstream combustion zone C where they are combusted at at least stoichiometric conditions with respect to oxygen. An oxygen-containing gas, preferably oxygen, can be introduced into said combustion zone via line 35. This combustion zone may be any appropriate combustion device. Non-limiting preferred combustion devices suitable use in the present invention include boilers, furnaces, kilns, internal combustion engines, and various chemical process units. Such devices produce useful thermal, mechanical, and/or electrical energy.

Although not critical to the present invention, the flue gases from the combustion zone may be passed to a cooling zone (not shown) for direct or indirect cooling. If a cooling zone is used, the flue gases will be cooled by at least 1000° F., preferably to a temperature of about 400° F. to 600° F., more preferably to about 450° F. to 550° F. This cooling zone may also act as a drying zone wherein an aqueous solution or slurry of acid and/or alkaline salts from a downstream wet gas scrubbing zone is atomized, or spray dried, into said cooling zone.

The flue gases from the cooling zone may be passed to solids separation zone (not shown) wherein particulate material is separated from said flue gases and collected. If a solids separation zone is used, it can be a so-called "baghouse" wherein particulate material is separated from the flue gases and collected in drums for disposal. It can also be a series of solids cyclone separators.

Returning now to the figure, the flue gases which exit combustion zone C via line 24 are split into two portions. One portion is enriched with oxygen via line 26, and routed via line 28 for recycling to the first, and second incineration stages. The other portion is sent to further purification which includes first sending it to a scrubbing zone S via line 30. The flue gases which are recycled to the incineration zone can be further split at each incineration stage to provide a primary oxygen enriched stream and a secondary oxygen enriched stream 29. The secondary oxygen enriched stream will of course be fed downstream from the primary oxygen enriched flue gas stream. If a solids separation zone is used and if it is comprised of a series of cyclones instead of a bag-house, then the portion of flue gases being passed to the scrubbing zone, if a wet gas scrubbing zone, can be passed to a bag-house prior to entering the wet gas scrubbing zone. The portions of the flue gases which are split will depend on such things as water balance in the system. The precise split is within the skill of those in the art and will not be further elaborated on herein. Generally, the portion of the flue gases directed to the wet gas scrubbing zone versus the portion recycled to the combustion zones is about 1 to 1, preferably about 1 to 2, and more preferably about 1 to 3.

It is preferred that before a portion of the flue gases is recycled, it first pass through a blower, or compressor B to provide enough compressing action to keep the pressure of the stream within an acceptable range. That is, to provide enough pressure for it to return to the combustion zones and to keep the water in vapor form.

Enough oxygen is added via line 26 so that the overall oxygen level of the flue gases entering combustion zone C is from a stoichiometric amount to about 20 vol. %. It may be desirable to have higher levels of oxygen in the incineration zone, especially the first stage, to enhance the burning of waste, especially waste having a low heat value. In such cases, oxygen may be added to said incineration stages via line 27 and/or 31. While the level of oxygen in the first stage of incineration may be from about 30 to 80 vol. %, preferably from about 40 to 80 vol. %, and more preferably from about 60 to 80 vol. %, the oxygen requirements of combustion zone C must be kept in mind. That is, not so much oxygen should be added to the recycled flue gases to the incineration zone that excessive oxygen breakthrough will occur and cause the flue gases to the combustion zone to exceed about 20 vol. %. This is can easily be calculated by those having ordinary skill in the art and will not be discussed in detail herein.

The other portion of the flue gases from combustion zone C is passed to a scrubbing zone S via line 30 wherein acid gases, and any remaining particulate material, are removed. The scrubbing zone may be comprised of any suitable means for removing acid gases. While both dry and wet methods may be used, it is preferred that the scrubbing zone be a wet gas scrubbing zone. The wet gas scrubbing zone will typically contain an aqueous alkaline material, such as sodium hydroxide, sodium carbonate, calcium hydroxide, potassium carbonate, and the like. If a cooling zone is used downstream of the combustion zone C, then precipitated acid salts from the wet gas scrubbing zone can be sent to the cooling zone, preferably as an aqueous solution or slurry, and fresh alkaline material can be introduced to maintain a steady state. At least a portion of the alkaline material may come from another scrubbing zone, which is downstream of wet gas scrubbing zone.

If the flue gases from the scrubbing zone are low enough in remaining pollutants, such as sulfur, HCl, and hydrocarbons to meet governmental regulations, then no additional processing is needed. For example, the flue gases can be discharged via line 32 to a $CO_2$ recovery or chemical plant. In the case where additional processing is needed in order to remove any remaining contaminants, the flue gases are passed to purification zone P via line 34. Remaining contaminants can include such things as carbon monoxide, hydrogen sulfide, nitrous oxides, sulfur oxides, HCl, and hydrocarbons. Depending on the nature of the pollutants which remain in the flue gases, purification zone P may contain one or more stages. It is preferred for the types of flue gases and pollutants encountered in the incineration of hazardous waste material that the following stages be provided: (a) a stage for removing CO and other light gases, such as hydrocarbon gases, which stage is represented by a vessel comprised of an absorbent material, such as an aqueous cuprous chloride solution, or an organic solvent, preferably a $C_1$ to $C_4$ alcohol, preferably ethanol; (b) a stage for removing acid gases and halides such as $Cl_2$, $F_2$, etc., and any remaining particulate material, which zone is preferably operated by passing the flue gases through an aqueous alkaline solution or slurry; and (c) a stage for removing any residual hydrocarbon gases and sulfur impurities, which zone can be represented by a bed of activated carbon. If necessary, an additional zone may be employed which can be comprised of an organic solvent treatment for removing any residual CO and organic gases. The organic solvent may be a fuel source for the incineration and combustion zones, which fuel, along with hydrocarbon contaminants absorbed from the flue gases and spent carbon, can be sent to the incineration and combustion zones as additional fuel. While it is preferred that the sequence of stages be as set forth above, it is to be understood that any appropriate sequence may be used.

The above described stages can be regenerated by any appropriate means, which means are well known in the art. For example, if a stage is used employing an aqueous cuprous chloride solution, it can be regenerated by heating the spent cuprous chloride to release CO. The released CO can be sent to the combustion zones. The alkaline scrubbing zone can be comprised of any appropriate solution or slurry for scrubbing acid gases. Non-limiting examples of suitable solutions or slurries include aqueous alkaline materials as well as alkanolamines, such as monoethanolamine. Preferred aqueous alkaline solutions include sodium hydroxide solutions, sodium carbonate solutions, calcium hydroxide solutions and slurries, and potassium carbonate solutions. Preferred are sodium hydroxide solutions and calcium hydroxide solutions and slurries. Of course, such an alkaline stage is typically operated by removing precipitated salts and maintaining steady state conditions by adding fresh alkaline scrubbing solution or slurry.

Discharge via line 36, from purification zone P, is a purified gaseous stream which can be used as a substitute for plant air. That is, it can be used for such things as: a carrier, or diluent, to the incineration, or combustion, means; an inert gas for the blanketing of tanks of combustibles; an atomizing gas for any hazardous liquid or liquid fuel burned in the incineration means; an atomizing gas for the water sprays in the scrubbing/cooling zones; process plant air; instrument air; and/or for the manufacture of chemicals, such as fertilizers.

What is claimed is:

1. A process for incinerating waste materials so that substantially all of the contaminants are removed from the resulting title gas, comprising:
   (a) feeding combustible waste material into an incineration zone containing two temperature stages, the first stage operated at a temperature from about 1400° F. to 2500° F., and the second stage operated at a temperature from about 1500° F. to 3000° F., wherein recycle flue gas from a downstream combustion zone and oxygen are fed to said incineration zone;
   (b) mixing said flue gases from said incineration zone with oxygen;
   (c) passing said mixture from (b) above to a combustion zone which is operated by burning a combustible fuel;
   (d) adding oxygen to a portion of the flue gases from said combustion zone, and recycling said mixture of oxygen and flue gases to both the incineration stages such that at least a stoichiometric amount of oxygen is present in the recycle flue gases passed to both the incineration stages;
   (e) passing another portion of said flue gases from the combustion zone to a scrubbing zone wherein acid gases are removed; and
   (f) passing the title gases from the scrubbing zone to a purification zone containing one or more of the following stages; (i) a stage for removing CO and hydrocarbon gases; (ii) a stage for removing additional acid gases; and (3) a stage for removing HCl, $SO_x$, $NO_x$, and S.

2. The process of claim 1 wherein the combustible waste material fed into the incineration zone is a hazardous material.

3. The process of claim 2 wherein the temperature of the first incineration stage is from about 1800° F. to about 2200° F.

4. The process of claim 3 wherein the temperature of the second incineration stage is from about 2000° F. to about 2300° F., with the proviso that the temperature of said second incineration stage is at least 100° F. higher than that of the first incineration stage.

5. The process of claim 2 wherein the flue gases from the first incineration stage are passed through a cyclone separator before entering the second incineration stage.

6. The process of claim 1 wherein the recycle flue gas stream to the first incineration stage contains from about 40 vol. % to about 80 vol. % oxygen.

7. The process of claim 6 wherein the recycle flue gas stream to the first incineration stage contains from about 60 vol. % to about 80 vol. % oxygen.

8. The process of claim 1 wherein the scrubbing zone is a wet gas scrubbing zone.

9. The process of claim 1 wherein the purification zone for removing CO and hydrocarbon gases is comprised of: (i) an organic solvent, or (ii) an aqueous cuprous chloride solution.

10. The process of claim 9 wherein the organic solvent is a $C_1$ to $C_4$ alcohol.

11. The process of claim 1 wherein the purification zone for removing residual hydrocarbon gases and sulfur impurities is comprised of activated carbon or a molecular sieve.

12. The process of claim 8 wherein the wet scrubbing zone is a stage for removing additional acid gases and is comprised of an aqueous alkaline scrubbing solution or slurry.

13. The process of claim 1 wherein the temperature of the first incineration stage is from about 1900° F. to about 2100° F. and the temperature of the second incineration stage is front about 2000° F. to about 2300° F., with the proviso that the second incineration stage is operated at a temperature which is at least 100° F. higher than that of the first incineration stage.

14. The process of claim 1 wherein the purification zone is one wherein the following stages are present: (a) a stage for removing CO and is comprised of an aqueous solution of cuprous chloride; (b) a stage for removing residual acid gases and is comprised of an aqueous alkaline solution or slurry; and (c) a stage for removing hydrocarbon gases and sulfur impurities and is comprised of activated carbon.

15. The process of claim 1 wherein oxygen is added to the recycle flue gas from the combustion zone, sufficient in amount that the overall oxygen level of the flue gases entering the combustion zone ranges from a stoichiometric amount to about 20 vol. %.

16. The process of claim 1 wherein the flue gases recycled to the first incineration stage ranges from about 20 vol. % to about 80 vol. %.

* * * * *